United States Patent Office 3,258,161
Patented June 28, 1966

3,258,161
KETTLE WITH DOSAGE-APPLIANCE
Albert W. Wolven, Eemsstraat 44 II,
Amsterdam, Netherlands
Filed Dec. 13, 1963, Ser. No. 330,407
1 Claim. (Cl. 222—41)

The aim of the invention is to enable a pre-determined quantity of liquid to be dosed in a cheap kettle in an easy manner.

Kettles with load indication are already known from the American Letters Patent No. 3,091,302 and the Netherlands Letters Patent No. 86,284, which kettles have their drawbacks in that the construction is too complicated, affecting the cost-price adversely, while handling these kettles requires concentrated attention.

Further, there is known from the American Letters Patent No. 3,052,375 a container allowing the measuring of portions of the liquid contents, based on the degree of inclination of the product with respect to the level of the liquid contained in it or a portion thereof.

The same drawbacks as aforestated also apply here. The method of measuring is different from that claimed in this application.

Finally, there is known from the American Letters Patent No. 482,972 a tea-kettle having formed integral with it a spout extending approximately the full length of the body. The said spout, in particular the upper part of it, neither offers nor aims at what is feasible with the front side ending in a spout of the kettle with dosage appliance as described in the present application.

The kettle which is the subject of this application concerns a kettle with a dosage appliance, having a handle fixed to it at the upper side and back, with the characteristic that the portion of the handle that is directed towards the underside and frontside of the kettle has been provided with wedge-shaped or pointed projections, in such a way that when supporting the handle with kettle under these projections the level of the liquid will adjust itself by gravitation to such a height that the volume of the liquid contained in the kettle corresponds with the volume pertaining to the projection concerned and indicated on the handle.

A kettle as described before with the characteristic that around the handle, a sliding organ has been fitted, having at its underside a wedge-shaped or pointed projection attached in such a way that when supporting the handle with the kettle under the projection of the said organ, the level of the liquid will adjust itself by gravitation to such a height that the volume of the liquid contained in the kettle corresponds with the volume as indicated on the handle by the sliding organ.

Kettles with a dosage appliance having an extended frontside which inclines forward and ends in a spout, the frontside of this spout being in a direct line with the frontside of the kettle and of which spout the edge bounding the aperture is higher on the frontside and is positioned with respect to the handle in such a way that the kettle can receive and keep a vertical jet of liquid, up to a position in which the frontside of the kettle is in a horizontal plane.

The invention will be explained with the aid of the drawing:

FIG. 1 is a cross section illustrating the kettle in tilting position, hanging in equilibrium from the projection situated farthest from the spout, in which position the kettle can hold a maximum of 1 unit of liquid. The extended front side of the spout and the position of that spout with respect to the handle make it possible for the kettle, even in this slanted position, to receive a vertical jet of liquid.

Description I

Figure 2:
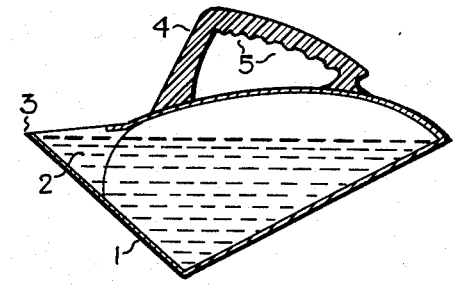
FIG. 2 is a cross section illustrating the kettle in tilting position hanging in equilibrium from the projection nearest to the spout, in which position the kettle can hold the largest measurable number of units.

The handle (FIG. 2, 4) has been fixed to the kettle in such a manner and the projections (FIG. 2, 5) are situated on the said handle in such a way that if the kettle with handle is supported from under one of the said projections, the kettle assumes a tilting position with frontside (FIG. 2, 1) ending in a spout (FIG. 2, 2) pointed downwards, see FIG. 2.

Figure 1:
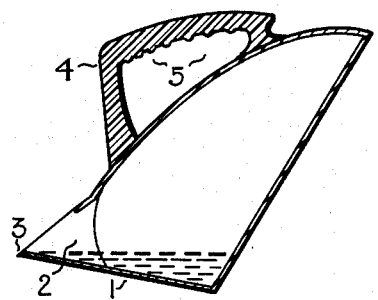

The degree of inclination will be accordingly larger as the projection, on which the kettle with handle is hanging in equilibrium, is situated farther from the spout, see FIG. 1.

The quantity of liquid that the kettle can maximally hold in forwardly tilted position, is naturally determined by the height of the pointedly shaped outer end (FIG. 2, 3) (FIG. 1, 3) of the spout aperture with respect to the kettle-body (FIG. 1 and FIG. 2).

Therefore, the position of the kettle, like for example illustrated in FIGURES 1 and 2 and the positions in between each time inherently correspond to a certain quantity of liquid, which quantity will hereafter be described as one unit or more units.

The projections are situated on the handle in such a way that the kettle can hold a maximum of one unit if the kettle with handle is supported from under the projection that is situated farthest from the spout. (FIG. 1). The said projection has been marked with the numeral 1.

The kettle can hold a maximum of two units, if it is supported from under the second projection situated next to that marked 1, etc.

The situation as illustrated in FIG. 2 shows the kettle with handle supported from under the last projection situated nearest to the spout, in which position the kettle can hold the largest measurable number of units.

Description II

As a consequence of the shape of the kettle, the projections must be situated ever closer to each other according as they are situated closer to the spout, in order to neutralize the progressivity of the kettle's filling-capacity.

To measure smaller units or fractions of units, certain projections would have to be situated so closely to each other that it would be impossible to support one projection without touching the projection next to it and this would adversely affect exact measuring.

Figure 3:
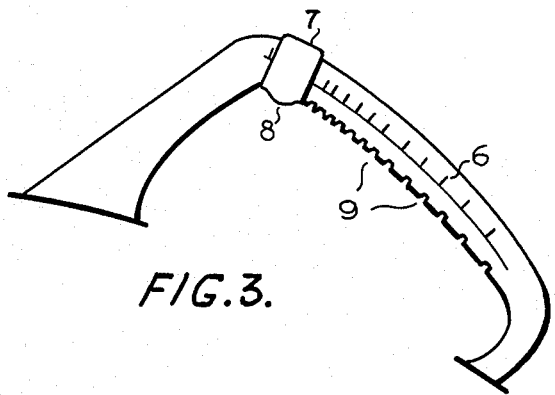
FIG. 3 is a side view illustrating a different handle that may be used optionally and which has been provided with a sliding organ having at the underside 1 a wedge-shaped or tapering projection, which organ can be caused to catch on each of the notches situated crosswise at the underside of the handle.
Figure 4:
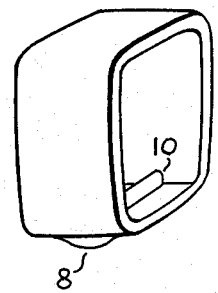
FIG. 4 is an enlarged perspective view of the sliding organ manufactured from flexible man-made material, provided at the underside 1 with a wedge-shaped or tapering projection and on the inner side of the bottom with a crosswise ridge.

To meet this objection, a handle has been designed as shown in FIG. 3, which handle has been provided at the underside with crosswise notches (9) and around which handle a hull-shaped organ (7) has been slipped, of which an enlarged view is shown in FIG. 4.

The said hull-shaped organ can be moved along the whole length of the handle and can be caused to catch on each of the notches (9) (FIG. 3) of the handle. Along the track the organ can describe, the handle shows a graduation (FIG. 3, 6).

At the underside of the said organ (FIG. 4) a similar projection (8) is shown as described hereinbefore. At the inner side of the bottom of the organ is a ridge (FIG. 4, 10) which fits into the space of each of the notches of the handle (FIG. 3, 9).

Figure 5:
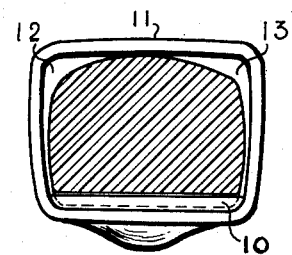
FIG. 5 is an enlarged cross section of the handle with the organ slipped around that handle, showing the ridge that has caught on one of the notches of the handle.

When the sliding organ (FIG. 4) is positioned around the handle in such a way that the ridge fills up the space of one of the notches (FIG. 5, 10) the upper part of the organ (11) touches the convex upper side of the handle in the middle, leaving spaces (12 and 13) on either side in between. The measurement of these spaces where they are at their height, exceeds the height of the organ's ridge.

If one exercises pressure, for example with thumb and index-finger, on the longitudinal upper edges of the organ which organ is made of flexible man-made material, the upper portion (FIG. 6, 11) will bend around the handle's shape, while the upper edges of the organ arrive at a lower position.

Figure 6:
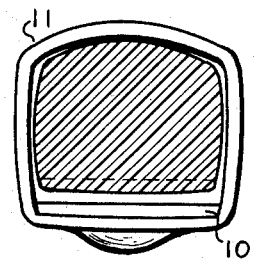
FIG. 6 is an enlarged cross section of the handle with the organ slipped around that handle, now showing the ridge outside that notch. The upperside of the organ is now stretched archwise around the convex upperside of the handle.

The ridge (10) which is indirectly connected with the said edges, also descends and to such an extent that it disengages entirely from the notch (FIG. 6, 10).

In this position, the organ can be moved unhindered along the full length of the handle.

To place the organ with the ridge in another pitch, the organ is positioned with the ridge exactly under the desired notch, the graduation being of assistance in determining the exact spot. Subsequently, one releases the pressure on the organ, whereupon the upper portion recovers from the bent position into its original shape, moving the ridge upwardly until this ridge fills up the space of the notch in question.

As already stated, the graduation on the handle (FIG. 3) enables the organ to be placed with the ridge in the correct position under the notch, into which it will subsequently be caused to catch. Moreover, small deviations from that position will be corrected owing to the tapering shape of both ridge and notch.

The notches have been placed on the handle in such a way that when the organ has caught into one of these notches, and the kettle with handle, being supported under the projection of the organ, is hanging in tilted position, the kettle in that position can hold a maximum of so many units as indicated by the figures to be found on the handle immediately before that edge of the organ that is directed towards the front of the kettle.

Operation

If one desires to dose a certain number of units of liquid with the kettle having a handle as shown in FIG. 3, one exercises pressure on the upper edges of the organ (7) and moves it along the handle until the front edge of the organ almost touches a graduation-bar, which bar corresponds with a figure indicating the number of units desired.

After releasing the pressure, the organ will catch into the notch pertaining to that figure. The index- or middle finger is placed under the organ with which finger the kettle is lifted up, whereupon it assumes instantly a tilting position. The spout of the kettle is then placed under a tap and the kettle is filled until overflow begins at the spout aperture. As soon as the tap is closed or the kettle is removed from the jet of liquid, the kettle is brought into horizontal position.

What I claim is:

A kettle or the like, having a handle on the upper side, on which an organ has been fitted having at its underside a wedge-shaped projection, by which organ and projection the kettle with the handle can be carried in equilibrium and which organ can be moved in a curved line along the handle and along a calibration showing on the handle, with the aid of which the position of the spout-aperture with respect to the kettle hanging in equilibrium can be changed in such a way that the filling capacity of the kettle as limited by that spout-aperture can be adjusted at choice and can be determined down to deciliters and fractions thereof, said kettle having an extended frontside which inclines forwardly and ends in a spout, the frontside of this spout being in a direct line with the frontside of the kettle and of which spout the edge bounding the aperture is higher on the frontside and is positioned with respect to the handle in such a way that the kettle can receive and keep a vertical jet of liquid, up to a position in which the front-side of the kettle is in a horizontal plane.

References Cited by the Examiner

UNITED STATES PATENTS

D. 194,285  12/1962  Miller.

FOREIGN PATENTS 34,146  2/1925  Denmark.
1,137,186  5/1957  France.
601,635  2/1949  Great Britain.

M. HENSON WOOD, JR., *Primary Examiner.*

LOUIS J. DEMBO, *Examiner.*

A. N. KNOWLES, *Assistant Examiner.*